US011021385B2

(12) United States Patent
Maillet et al.

(10) Patent No.: US 11,021,385 B2
(45) Date of Patent: Jun. 1, 2021

(54) SLUDGE DEWATERING DEVICE

(71) Applicant: VEOLIA WATER SOLUTIONS & TECHNOLOGIES SUPPORT, Saint Maurice (FR)

(72) Inventors: Laetitia Maillet, Montreuil (FR); Benjamin Herbreteau, Saint-Martin-la-Garenne (FR); Vincent Georgeaud, Andresy (FR)

(73) Assignee: VEOLIA WATER SOLUTIONS & TECHNOLOGIES SUPPORT, Saint Maurice (FR)

( * ) Notice: Subject to any disclaimer, the term of this patent is extended or adjusted under 35 U.S.C. 154(b) by 0 days.

(21) Appl. No.: 15/767,314

(22) PCT Filed: Oct. 11, 2016

(86) PCT No.: PCT/FR2016/052626
§ 371 (c)(1),
(2) Date: Apr. 10, 2018

(87) PCT Pub. No.: WO2017/064412
PCT Pub. Date: Apr. 20, 2017

(65) Prior Publication Data
US 2018/0297881 A1    Oct. 18, 2018

(30) Foreign Application Priority Data
Oct. 12, 2015 (FR) ...................... 1559675

(51) Int. Cl.
*C02F 11/00* (2006.01)
*C02F 11/122* (2019.01)
(Continued)

(52) U.S. Cl.
CPC ............ *C02F 11/006* (2013.01); *B01D 19/00* (2013.01); *B01D 25/164* (2013.01);
(Continued)

(58) Field of Classification Search
CPC .... B01D 61/56; B01D 21/0009; B01D 35/06; B01D 61/427; C02F 1/4698;
(Continued)

(56) References Cited

U.S. PATENT DOCUMENTS 4,107,026 A * 8/1978 Freeman ................ B01D 35/06
                                               204/629
5,034,111 A * 7/1991 Kondo .................. B01D 25/127
                                               204/629
(Continued)

FOREIGN PATENT DOCUMENTS

CN    101823820    9/2010
CN    102361829    2/2012
(Continued)

OTHER PUBLICATIONS

Search Report and Written Opinion issued for Singaporean Patent Application No. 11201802962Y, dated Apr. 23, 2019, 10 pages.
(Continued)

*Primary Examiner* — Salil Jain
(74) *Attorney, Agent, or Firm* — Hamre, Schumann, Mueller & Larson, P.C.

(57) ABSTRACT

Sludge dewatering device that makes it possible to achieve a high degree of dryness while retaining a limited energy consumption and limited industrial risks, comprising at least one first plate (21*a*) equipped with a first electrode (23*a*), and at least one second plate (21*b*) equipped with a second electrode (23*b*), wherein the first and second plates (21*a*, 21*b*) define a chamber (22) configured for receiving a sludge to be dewatered (10*a*), wherein the first and second electrodes (23*a*, 23*b*) are configured for establishing an electric field within the chamber (22),
wherein the chamber (22) is equipped with at least one discharge port (32, 34), provided in the bottom third of the chamber (22), configured for discharging a filtrate (15*a*,
(Continued)

16a), and wherein the chamber (22) is equipped with at least one injection port (33), provided in the top third of the chamber (22), configured for injecting the pressurized purge fluid (11a) into the chamber (22).

16 Claims, 2 Drawing Sheets

(51) Int. Cl.
  *B01D 35/06* (2006.01)
  *B01D 25/164* (2006.01)
  *B01D 25/21* (2006.01)
  *B01D 25/28* (2006.01)
  *B01D 19/00* (2006.01)
  *B01D 25/30* (2006.01)

(52) U.S. Cl.
  CPC ......... *B01D 25/215* (2013.01); *B01D 25/285* (2013.01); *B01D 25/305* (2013.01); *B01D 35/06* (2013.01); *C02F 11/122* (2013.01)

(58) Field of Classification Search
  CPC ....... C02F 11/006; C02F 11/12; C02F 11/121; C02F 11/122; C02F 11/128; C02F 11/15
  See application file for complete search history.

(56) References Cited

U.S. PATENT DOCUMENTS

| | | |
|---|---|---|
| 2004/0144735 A1 | 7/2004 | Shepherd et al. |
| 2011/0000857 A1 | 1/2011 | Fernando |
| 2012/0055797 A1 | 3/2012 | Dermoune et al. |

FOREIGN PATENT DOCUMENTS

| | | |
|---|---|---|
| CN | 104030543 | 9/2014 |
| EP | 0384081 | 8/1990 |
| JP | S5567397 | 5/1980 |
| JP | S60114315 | 6/1985 |
| JP | S62125812 | 6/1987 |
| JP | H08131729 | 5/1996 |
| WO | 03068691 | 8/2003 |
| WO | 2010067340 | 6/2010 |
| WO | 2016135422 | 9/2016 |

OTHER PUBLICATIONS

International Search Report and Written Opinion issued in PCT/FR2016/052626 dated Jan. 20, 2017 (13 pages).
Office Action issued for Chinese Patent Application No. 201510750232.3, dated Aug. 4, 2020, 25 pages including English translation.

\* cited by examiner

1

SLUDGE DEWATERING DEVICE

FIELD OF THE INVENTION

The present disclosure relates to a sludge dewatering device that makes it possible to achieve a high degree of dryness while retaining a limited energy consumption and limited industrial risks.

Such a device may in particular be used to dewater sludge, the sludge derived from wastewater treatment plants for example, in preparation for the incineration thereof or the landfilling thereof.

PRIOR ART

Sludge, such as the sludge derived from wastewater treatment plants for example, is generally subjected to dewatering followed by recovery, as organic soil conditioner (land application of sludge) or by combustion (incineration), or burying at a landfill site. In the case of combustion, the dryness of the sludge achieved at the end of the dewatering step, that is to say the ratio of dry matter relative to the total mass of sludge, should be sufficient to enable the combustion to be self-sustaining: a dryness of 30% to 45% is thus preferred. Similarly, in the case of landfilling, certain national legislations require a minimum degree of dryness before landfilling of the sludge, of the order of 40% for example. The importance of developing effective dewatering processes and devices is thus understood, in particular when the sludge is of a type that is difficult to dewater as is the case in particular for biological sludge from a wastewater treatment plant.

Among the known processes, some aim to mechanically dewater the sludge: these may be centrifugation or filtration processes under pressure, with in particular the use of a filter press or a belt filter. However, such processes are limited. For example, for wastewater treatment plant sludge, they make it possible to achieve dryness values of only 15% to 40%; this maximum value of 40% only being achieved in rare cases with particularly effective devices and sludge that is particularly easy to treat (predominantly mineral sludge for example). Thus, for some sludge, such as biological sludge from a wastewater treatment plant, it is difficult to achieve a dryness of 30%, which may be insufficient depending on the future of this sludge.

Other processes aim to thermally dewater the sludge: they then heat the sludge with the aim of drying it. These processes are very effective: depending on the heating temperature and the duration of the treatment, it is possible to achieve dryness values of the order of 90%. However, these processes are highly energy-consuming and consume at least 700 kWh per tonne of water removed (kWh/tWR), or even more, whereas a mechanical process in general consumes less than 20 kWh/tWR depending on the type of technology (filter press, belt filter or centrifuge).

Finally, electrically-assisted mechanical dewatering processes, referred to as electro-dewatering processes, aim to filter a volume of sludge under pressure, for example in a filter press, by additionally applying an electric field. This electric field, added to the hydrolysis phenomenon that it creates, makes it possible to break the water-sludge bonds, facilitating the migration of the water molecules in the opposite direction to the solid particles. Such electrical assistance therefore makes it possible to improve the dewatering of the sludge and thus to gain a few additional dryness points. However, such a process is confronted with certain difficulties in the case of certain sludge.

Specifically, during electro-dewatering, the sludge behaves as an electrical resistance. And yet, in the case of certain sludge for which the electromobility and/or the amount of ions is low, a rapid rise in the electrical resistance of the sludge is observed. Consequently, via Joule effect and at constant intensity, the rapid rise in the electrical resistance of the sludge results in an increase in the temperature. The drier the sludge, the lower the electromobility and therefore the higher the electrical resistance. This simultaneously leads to an increase in the temperature, in particular on the anode side which is the driest zone during the electro-dewatering. For this reason, the duration of such electro-dewatering operations is necessarily limited in time so as not to damage the electro-dewatering device.

Furthermore, the water hydrolysis reactions taking place in the sludge under the effect of the applied electric field are responsible for the production of gaseous molecular hydrogen $H_2$ at the cathode and also of gaseous molecular oxygen $O_2$ at the anode. Hence the simultaneous presence of these two gases in the electro-dewatering device may lead to the formation of an explosive atmosphere. Moreover, depending on the nature of the sludge to be dewatered, other electrolysis reactions are also found to take place, which may lead to the formation of gases that are hazardous, toxic, explosive or corrosive for example, and notably of molecular chlorine $Cl_2$ when the sludge contains chlorides. In order to discharge these various hazardous gases, whether for the equipment or for the operators, the electro-dewatering devices are generally equipped with exhaust ports. However, it has been found that the latter have not always been adequate for properly discharging these various gases, and pockets of hazardous gas may still be present in the sludge to be dewatered.

Finally, certain reactions at the electrodes may also lead to a change in the pH of the filtrate: thus, an acidification is generally observed at the anode, whereas a basification occurs at the cathode, thus making it necessary to analyze the pH of the filtrate and perform an optional additional step of neutralization of the latter prior to release into the environment.

There is therefore a real need for a sludge dewatering process that is free, at least partly, of the drawbacks inherent to the abovementioned known devices.

BACKGROUND OF THE INVENTION

The present disclosure relates to a sludge dewatering device, comprising at least one first plate equipped with a first electrode, and at least one second plate equipped with a second electrode, wherein the first and second plates define a chamber configured for receiving a sludge to be dewatered, wherein the first and second electrodes are configured for establishing an electric field within the chamber, wherein the chamber is equipped with at least one discharge port, provided in the bottom third of the chamber, configured for discharging a filtrate, and wherein the chamber is equipped with at least one injection port, provided in the top third of the chamber, configured for injecting a pressurized purge fluid into the chamber.

In the present disclosure, a fluid is considered to be "pressurized" when its feed pressure into the chamber is greater than the outlet pressure of the filtrates.

Thus, owing to such a configuration, it is possible to drive the filtrate and also any gases produced back toward the bottom of the chamber and therefore toward the discharge ports: the discharging of the latter is therefore facilitated and the risks of hazardous gases accumulating in the chamber are thus reduced. The durability of the device is thus preserved and the working environment becomes less hazardous for the operators.

Moreover, the purge fluid may also act as a coolant, cooling the electrodes and therefore prolonging the electro-dewatering process, which makes it possible to achieve higher degrees of dryness.

The purge fluid may also serve as a carrier for introducing certain chemical species into the chamber for the purpose of correcting certain parameters of the medium, its pH for example, or its electrical resistance.

This device is therefore particularly efficient in the context of an electro-dewatering process, such as that described for example in French patent application No. 15 51636.

In certain embodiments, at least one plate is equipped with a filter medium. Such a filter makes it possible to retain the solid matter of the sludge and allow the water extracted from the sludge to pass through. Preferably, each plate is equipped with a filter medium. It may notably be a filter cloth.

In certain embodiments, at least one plate is equipped with at least one membrane configured to be deformed by a compression fluid, notably compressed air. Such a membrane makes it possible to reduce the volume of the chamber and therefore to compress the sludge present in the chamber in order to mechanically extract a portion of the water contained in the sludge. Each plate may be equipped with such a membrane, but preferably only one plate per chamber is so equipped, preferably the plate equipped with the cathode.

In certain embodiments, the device comprises a booster configured for supplying the membrane with compressed air.

In certain embodiments, the device comprises a power supply, for example an electric generator, a rectifier or a battery, configured for powering the first and second electrodes.

In certain embodiments, the device comprises a hydraulic jack configured for holding the first and second plates against one another so as to ensure hermeticity of the chamber.

In certain embodiments, the device comprises a plurality of first plates and a plurality of second plates.

In certain embodiments, each plate is equipped with at least one discharge port. This makes it possible on the one hand to discharge the filtrate more easily, a discharge port being provided on either side of the chamber. On the other hand, this makes it possible to separately discharge the gases produced at each electrode, typically molecular hydrogen on one side and molecular oxygen on the other side, in order to prevent the formation of a possible explosive mixture.

In certain embodiments, each plate is equipped with at least one injection port. This makes it possible to propel the gases produced at each electrode more efficiently. Furthermore, this makes it possible to inject optionally different purge fluids at each electrode.

In certain embodiments, said at least one discharge port of the first plate and said at least one discharge port of the second plate are connected to different evacuation channels.

In certain embodiments, said at least one injection port of the first plate and said at least one injection port of the second plate are connected to different injection channels.

In certain embodiments, said at least one injection port of the first plate and said at least one injection port of the second plate are configured for injecting two different purge fluids into the chamber. It is thus possible to select a particular purge fluid for each electrode as a function of the particular features of the latter and also of the chemical reactions observed on contact therewith.

In certain embodiments, the device comprises a supply of a first purge fluid.

In certain embodiments, the device comprises a supply of a second purge fluid, different from the first purge fluid.

In certain embodiments, a purge fluid is a gas or a mixture of gases that is/are inert and/or nontoxic, nonflammable and unable to create an explosive zone in the presence of $H_2$ or $O_2$.

In the present disclosure, a gas is considered to be nontoxic, or nonflammable or unable to create an explosive zone when it does not have exhibit these properties under the concentration, pressure and temperature conditions in which it is found within the chamber.

In certain embodiments, a purge fluid is selected from the following gases: $N_2$, He, Ar, $CO_2$, air or a mixture thereof.

In certain embodiments, a purge fluid is moistened. This makes it possible on the one hand to improve the cooling of the electrodes, and on the other hand to correct premature drying of the anode, which is usually responsible for a rapid increase in temperature. It is thus possible to prolong the electro-dewatering process and therefore achieve higher degrees of dryness.

In certain embodiments, the moisture content of the purge fluid is between 0 and 600 g of water vapor per kg of dry gas, preferably between 10 and 300 g water vapor/kg dry gas.

In certain embodiments, a purge fluid comprises at least one electrolyte. This makes it possible to provide electrolytes within the medium so as to obtain a better distribution of the current density within the sludge and therefore to reduce the appearance of a zone with higher electrical resistance that dries out more quickly. It is thus possible to prolong the electro-dewatering process and therefore achieve higher degrees of dryness. Furthermore, the risk of premature degradation of the electrodes is reduced by avoiding reaching the breakdown voltage of the material of which they consist.

In certain embodiments, at least one electrolyte is selected from the following species: NaCl, KCl, $Na_2SO_4$ or $K_2SO_4$.

In certain embodiments, a purge fluid comprises at least one electrolyte comprising a compound containing the element chlorine, for example a chloride. This promotes the formation of aqueous molecular chlorine $Cl_{2(aq)}$ within the medium: the latter then provides a disinfectant action on the sludge cake obtained. It is possible to use NaCl or KCl, for example.

In certain embodiments, a purge fluid is sulfate-free. This makes it possible to reduce the risk of precipitation of sulfate scale and therefore the appearance of a deposit of scale on the electrodes, leading to additional electrical resistance. Such a precaution is particularly preferable on the cathode side.

In certain embodiments, a purge fluid comprises at least one acid. This makes it possible to compensate for any basification of the medium occurring naturally during electro-dewatering, in particular at the cathode. It is possible to use HCl, for example.

In certain embodiments, a purge fluid comprises at least one base. This makes it possible to compensate for any acidification of the medium occurring naturally during electro-dewatering, in particular at the anode. It is possible to use NaOH, for example.

In certain embodiments, a purge fluid is injected at a pressure that is at least 50 mbar higher relative to the filtrate outlet pressure, and preferably at least 200 mbar higher relative to the filtrate outlet pressure. This makes it possible to drive the gases produced back toward the discharge ports more efficiently.

In certain embodiments, a purge fluid is injected at a temperature below 50° C., preferably below 30° C. This makes it possible to cool the electrodes more efficiently.

In certain embodiments, said at least one discharge port is provided at the bottom end of the filtration chamber.

In certain embodiments, said at least one injection port is provided at the top end of the filtration chamber.

In certain embodiments, the device comprises at least one valve or nonreturn device provided at or upstream of said at least one injection port. This makes it possible to prevent purge fluid or a gas produced during the electro-dewatering from flowing back through the injection port.

In certain embodiments, the device comprises at least one liquid/gas separator provided downstream of said at least one discharge port. This makes it possible to recover the liquid filtrate on the one hand and the gases produced on the other hand, so that they can be recycled or recovered, for example.

In certain embodiments, the device comprises a reinjection device configured for reinjecting at least a portion of at least one filtrate, as electrolyte, into the chamber. This allows a portion of the injected electrolytes to be recycled.

In certain embodiments, the sludge to be dewatered is a biological sludge derived from a wastewater treatment plant. This type of sludge specifically contains a high proportion of bound water. However, naturally, the present disclosure could be applied to other types of sludge, notably to industrial sludge.

The abovementioned features and advantages, and others too, will become apparent on reading the detailed description that follows, of examples of implementation of the proposed device. This detailed description refers to the appended drawings.

BRIEF DESCRIPTION OF THE DRAWINGS

The appended drawings are schematic and aim primarily to illustrate the principles of the invention.

In these drawings, from one figure (FIG) to the next, identical elements (or element parts) are identified by the same reference signs.

DETAILED DESCRIPTION OF EXEMPLARY EMBODIMENT(S)

In order to make the invention more concrete, an example of a dewatering device is described in detail below, referring to the appended drawings. It is recalled that the invention is not limited to this example.

Figure 1:
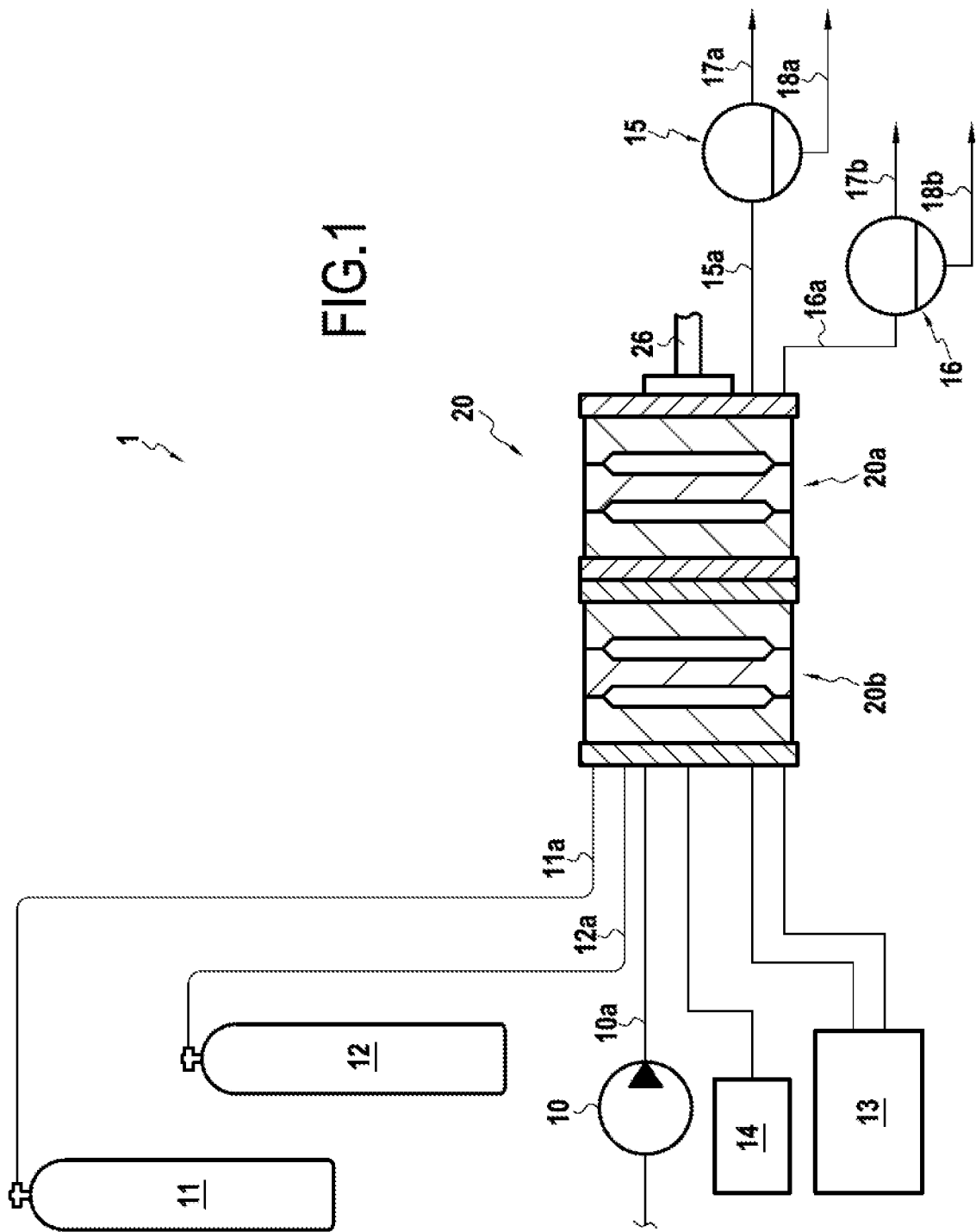
FIG. 1 is an overall diagram of an example of a device according to the invention.

FIG. 1 illustrates an example of a dewatering device 1 according to the invention. This device 1 comprises a filter press 20, a booster pump 10, a supply of a first purge fluid 11, a supply of a second purge fluid 12, an electric rectifier 13, a booster 14, a first liquid/gas separator 15 and a second liquid/gas separator 16.

Figure 2:
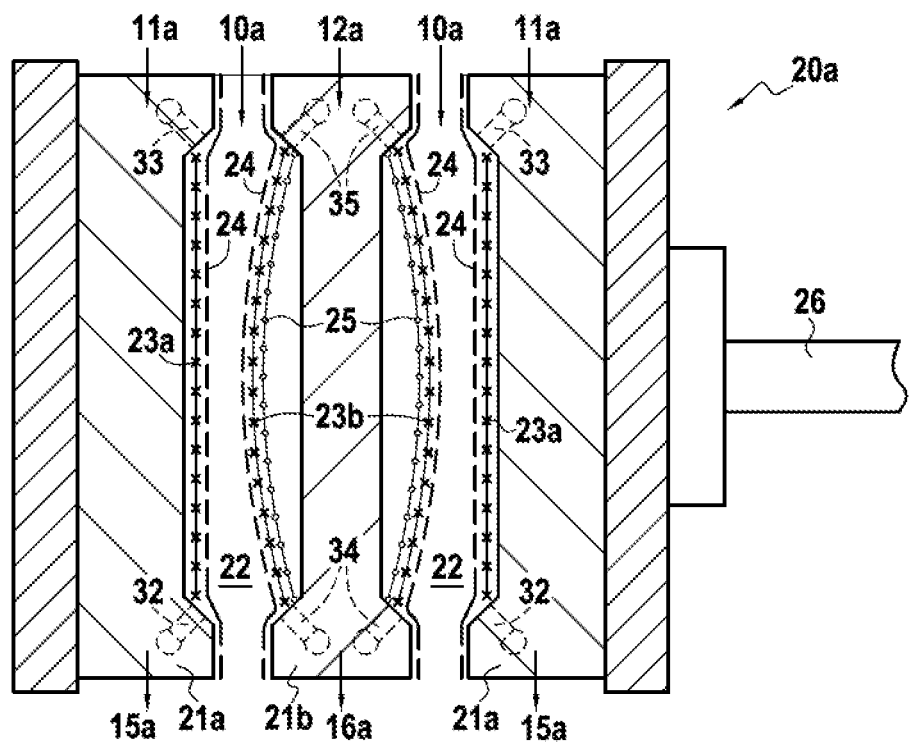
FIG. 2 is a diagram of a module of the filter press of this example of a device.

The filter press 20 comprises a plurality of modules 20a, 20b made up of plates 21a, 21b pressed against one another by a hydraulic jack 26 so as to ensure hermeticity between the various plates 21a, 21b. As can be seen in FIGS. 1 and 2, each plate 21a, 21b extends vertically.

A module 20a is shown schematically in FIG. 2. It comprises three plates 21a, 21b defining two chambers 22 into which the sludge to be dewatered 10a is introduced. Each wall of the plates 21a, 21b, defining one edge of a chamber 22, is equipped with an electrode 23a, 23b preferably taking the form of a grid: the side plates 21a are thus equipped with an electrode that forms the anode 23a and the central plate 21b is equipped on each of its faces with an electrode that forms the cathode 23b.

The internal wall of each plate 21a, 21b is equipped with a filter cloth 24 positioned in front of the electrode 23a, 23b in question. Each wall of the central plate 21b is additionally equipped with a membrane 25 positioned behind the electrode 23b in question.

Figure 3:
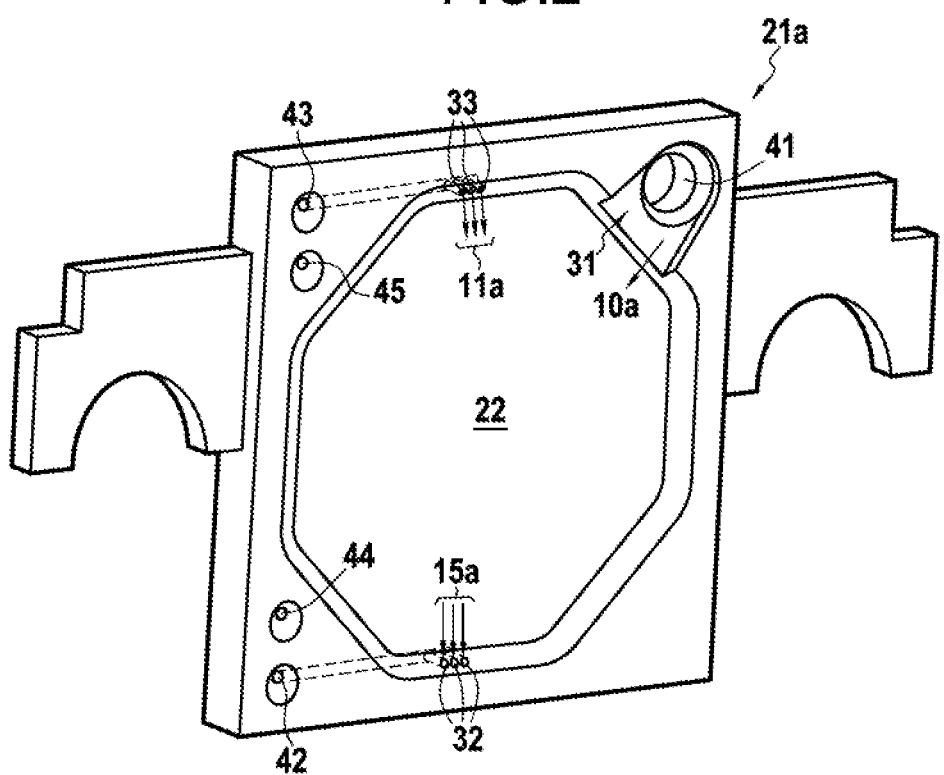
FIG. 3 is a perspective view of a plate of this filter press.

Each side plate 21a, also shown in FIG. 3, is equipped with a passage 31 for supplying sludge 10a connected to a first line segment 41 passing all the way through plate 21a at the periphery of the chamber 22. Each central plate 21b also has a sludge feed passage connected to a first line segment passing all the way through plate 21b at the periphery of the chamber 22. All the first line segments 41 are aligned so as to form, when the plates 21a, 21b are pressed against one another, a first sealed line forming a feed channel, connected to the booster pump 10 so as to supply the filter press 20 with sludge 10a.

Each side plate 21a is also equipped, at the bottom end of the chamber 22, with a plurality of discharge ports 32, connected to a second line segment 42, for discharging the filtrates 15a on the anode side, and, at the top end of the chamber 22, with a plurality of injection ports 33, connected to a third line segment 43, for injecting a first purge fluid 11a on the anode side.

Similarly, each central plate 21b is also equipped, at the bottom end of the chamber 22, with a plurality of discharge ports 34, connected to a fourth line segment 44, for discharging the filtrates 16a on the cathode side, and, at the top end of the chamber 22, with a plurality of injection ports 35, connected to a fifth line segment 45, for injecting a second purge fluid 12a on the cathode side.

In addition, each side plate 21a is equipped with a fourth line segment 44 that is not connected to the chamber 22 but is aligned with the fourth line segments 44 of the other plates so as to form, when plates 21a, 21b are pressed against one another, a sealed fourth line forming a discharge channel, for discharging the filtrates 16a collected on the cathode side via the various central plates 21b and connected to the inlet of the second liquid/gas separator 16.

In the same way, each side plate 21a is equipped with a fifth line segment 45 that is not connected to chamber 22 but is aligned with the fifth line segments 45 of the other plates 21a, 21b so as to form, when the plates 21a, 21b are pressed against one another, a sealed fifth line, forming a feed channel, connected to the second purge fluid supply 12 so as to supply the filter press 20 on the cathode side with second purge fluid 12a.

Similarly, each central plate 21b is equipped with a second line segment and with a third line segment so as to form, with its neighbours, a second line, forming a discharge channel, for discharging the filtrates 15a collected on the anode side via the various side plates 21a and connected to the inlet of the first liquid/gas separator 15 and, respectively, a third line, forming an injection channel, connected to the first purge fluid supply 11 so as to supply the filter press 20 on the anode side with first purge fluid 11a.

In addition, sixth line segments 46 are provided similarly in plates 21a and 21b so as to inject compressed air from the booster 14 into the membranes 25.

The operation of the dewatering device will now be described in detail.

Within the context of the present example, the sludge to be treated 10a is a biological sludge derived from a wastewater treatment plant. This type of sludge is derived from a membrane bioreactor operating directly on the screened raw water.

The sludge 10a, the initial dryness of which is around 0.9% in this example, that is to say 9 g/l, is admitted into the device 1 by means of the booster pump 10 and is fed into the filtration chambers 22 of the filter press 20 via the feed channel 41 and the feed passages 31. This sludge 10a may have undergone a preliminary chemical conditioning step during which certain chemical components are added to the sludge 10a to facilitate the treatment thereof and the dewatering thereof: thus, in this example, a coagulation aid, such as $FeCl_3$, and a flocculation aid, such as the polymer Flopam EM 640 TBD, are added.

Next, during a filtration step, the booster pump 10 generates a mechanical pressure of 8 bar within the sludge 10a which is then filtered with the aid of the filter cloths 24. This step is stopped when the flow rate of filtrate 15a, 16a discharged by the plates 21a, 21b reaches a predetermined low threshold. This step makes it possible to remove the free water present at the surface of the sludge flocs with a lower energy expenditure.

Once the sludge 10a has been filtered in the chambers 22 of the filter press 20, a step of compression alone is performed in the filter press 20. The compressed air booster 14 thus makes it possible to inflate the membranes 25 of the filter press 20 so as to compress the sludge 10a present in the chambers 22 until a pressure of about 11 to 12 bar is reached in the membranes 25 of plate 21b.

This step of compression alone makes it possible to extract a first portion of the interstitial water present in the sludge 10a in the form of filtrates 15a, 16a discharged through the discharge ports 32, 34 of plates 21a, 21b.

At the end of this step of compression alone, the compression is maintained and the electrical assistance is started in order to initiate an electro-dewatering step.

The electric rectifier 13 then applies a current between the pairs of electrodes 23a, 23b of each chamber 22. Initially, regulation is carried out at constant current. In this example, a current of about 9 A is selected, or about 40 $A/m^2$.

During this step, the water extracted from the sludge 10 is discharged in the form of filtrates 15a, 16a through the discharge ports 32, 34 of the plates 21a, 21b.

Then the first purge fluid 11a is injected into the chambers 22, on the side with the anode 23a, from the first purge fluid supply 11 and via the injection channel 43 and the injection ports 33. The second purge fluid 12a is also injected into the chambers 22, on the side with the cathode 23b, from the second purge fluid supply 12 and via the injection channel 45 and the injection ports 35.

In this example, the first purge fluid 11a is gaseous molecular nitrogen $N_2$ comprising water, $Na_2SO_4$ and NaOH; for its part, the second purge fluid 12a is gaseous molecular nitrogen $N_2$ comprising water, NaCl and HCl. In an example like this, the purge fluids thus comprise a gas phase and a liquid phase, dispersed in the gas phase in the manner of a mist, in which the electrolytes are dissolved.

In addition, the first and second purge fluids 11a and 12a are injected into the chambers 22 at an absolute pressure of 2 bar and at room temperature.

Then the gases generated during this electro-dewatering step, for example molecular oxygen and molecular hydrogen resulting from the hydrolysis of water, are driven by the purge fluids 11a, 12a back to the discharge ports 32, 34 of the plates 21a, 21b, via which they are then discharged along with the liquid filtrates. More precisely, the gases generated at the anodes 23a are driven back to the discharge ports 32 of the plates 21a and are therefore discharge within the filtrates 15a via the discharge channel 42 to the first liquid/gas separator 15. For their part, the gases generated at the cathodes 23b are driven back to the discharge ports 34 of the plates 21b and are therefore discharged within the filtrates 16a via the discharge channel 44 to the second liquid/gas separator 16.

In this example, the purge fluids 11a and 12a are injected continuously into the chambers 22 throughout the electro-dewatering step. However, in other examples, this injection could be carried out intermittently, so as to purge the chambers 22 completely at regular intervals.

Each separator 15, 16 then separates, within the filtrates 15a, 16a, the gas phase 17a, 17b, containing, depending on the case, the first or the second purge fluid mixed with the gases produced during electro-dewatering, and the liquid phase 18a, 18b comprising essentially the water extracted from the sludge 10a and also a portion of the electrolytes injected into the chambers 22 and/or produced at the electrodes 23a, 23b during electro-dewatering. A reinjection device may then be provided for recovering at least a portion of these electrolytes and reintroducing them into the purge gases 11, 12 in order to inject them back into the chambers 22.

Regulation at constant current is maintained until the temperature in the vicinity of an anode 23a, measured using a thermocouple for example, reaches 60° C.: when this condition is met, regulation of the current is abandoned in favor of regulation at constant voltage.

The electrical assistance at constant voltage is then maintained until the temperature in the vicinity of an anode 23a reaches a second threshold value: when this condition is met, the electrical treatment is stopped and the compression of the membranes 25 is released.

The hydraulic jack 26 may then release the plates 21a, 21b of the filter press 20 to allow removal of the dewatered sludge cakes from the chambers 22 of the filter press 20.

These cakes may then be landfilled, or recovered as organic soil conditioner or as energy.

The embodiments or examples of implementation described in the present disclosure are given by way of illustration and nonlimitingly, a person skilled in the art could easily, in view of this disclosure, modify these embodiments or examples of implementation, or envisage other ones thereof, while remaining within the scope of the invention.

Furthermore, the various features of these embodiments or examples of implementation may be used alone or may be combined with one another. When they are combined, these features may be as described above or otherwise, the invention not being limited to the specific combinations described in the present disclosure. In particular, unless otherwise specified, a feature described in connection with an embodiment or example of implementation may be applied in a similar manner to another embodiment or example of implementation.

The invention claimed is:
1. A sludge dewatering device, comprising
a first plate equipped with a first electrode;

a second plate equipped with a second electrode, at least one of the first plate and the second plate equipped with a filter; and a supply of a pressurized purge fluid, the pressurized purge fluid comprising a gas, wherein the first and second plates define a chamber configured for receiving a sludge to be dewatered, wherein the first and second electrodes are configured for establishing an electric field within the chamber, wherein the chamber is equipped with:

at least one discharge port, provided in the bottom third of the chamber, configured for discharging a filtrate from the filter, and at least one pressurized purge fluid injection port, provided in the top third of the chamber, connected to the supply of pressurized purge fluid for injecting the pressurized purge fluid into the chamber, the at least one pressurized purge fluid injection port being connected to the at least one discharge port via the chamber.

2. The device as claimed in claim 1, wherein each of the first plate and the second plate is equipped with at least one of the discharge ports, and wherein each of the first plate and second plate is equipped with at least one of the pressurized purge fluid injection ports.

3. The device as claimed in claim 2, wherein said at least one discharge port of the first plate and said at least one discharge port of the second plate are connected to different discharge channels, and wherein said at least one pressurized purge fluid injection port of the first plate and said at least one pressurized purge fluid injection port of the second plate are connected to different injection channels.

4. The device as claimed in claim 1, further comprising:

a supply of a second purge fluid, the second purge fluid being different from the pressurized purge fluid, wherein the first plate is equipped with the at least one pressurized purge fluid injection port, and wherein at least one of the first plate and the second plate is equipped with at least one second purge fluid injection port, provided in the top third of the chamber, connected to the supply of second purge fluid for injecting the second purge fluid into the chamber.

5. The device as claimed in claim 1, wherein the pressurized purge fluid supplied from the supply comprises the gas or a mixture of gases that is/are inert, nontoxic, nonflammable and unable to create an explosive zone in the presence of $H_2$ or $O_2$.

6. The device as claimed in claim 1, wherein the pressurized purge fluid supplied from the supply is moistened.

7. The device as claimed in claim 1, wherein the pressurized purge fluid supplied from the supply comprises at least one electrolyte.

8. The device as claimed in claim 7, wherein the at least one electrolyte supplied from the supply comprises a compound containing the element chlorine.

9. The device as claimed in claim 1, wherein the pressurized purge fluid supplied from the supply is sulfate-free.

10. The device as claimed in claim 1, wherein the pressurized purge fluid supplied from the supply comprises at least one acid.

11. The device as claimed in claim 1, wherein the pressurized purge fluid supplied from the supply comprises at least one base.

12. The device as claimed in claim 1, comprising at least one liquid/gas separator provided downstream of said at least one discharge port.

13. The device as claimed in claim 5, wherein the pressurized purge fluid supplied from the supply is selected from the following gases: $N_2$, He, Ar, $CO_2$, air or a mixture thereof.

14. The device as claimed in claim 7, wherein the pressurized purge fluid supplied from the supply comprises at least one electrolyte selected from the following species: NaCl, KCl, $Na_2SO_4$ or $K_2SO_4$.

15. The device as claimed in claim 10, wherein the pressurized purge fluid supplied from the supply comprises HCl.

16. The device as claimed in claim 11, wherein the pressurized purge fluid supplied from the supply comprises NaOH.

* * * * *